United States Patent Office 3,258,445
Patented June 28, 1966

3,258,445
SULPHOHALOGENATION OF HALOGENATED OLEFIN POLYMERS OBTAINED BY HALO-GENATING IN THE PRESENCE OF AMMO-NIUM SALTS AND TERTIARY AMINES
Jacques Schwander and Jean Fouré, Brussels, Belgium, assignors to Solvay & Cie., Brussels, Belgium, a company of Belgium
No Drawing. Filed Jan. 8, 1962, Ser. No. 165,016
Claims priority, application Netherlands, Jan. 31, 1961, 260,666
The portion of the term of the patent subsequent to Dec. 29, 1981, has been disclaimed
8 Claims. (Cl. 260—32.6)

The present invention relates to a process for the production of sulphohalogenated polymers and co-polymers of olefins and to the sulphohalogenated polymers with improved properties obtained by this process.

It is known to carry out the sulphochlorination of polyethylene by reacting a mixture of sulphurous anhydride and chlorine with the polymer in a suspension or solution in an inert organic liquid such as carbon tetrachloride.

It has been proposed to replace the mixture of chlorine and sulphurous anhydride in this process by sulphuryl chloride.

Finally, dry sulphochlorination has been described, in the absence of any solvent or diluent, performed by the reaction of chlorine and sulphurous anhydride on polyethylene grains brought to a temperature between 40 and 80° C.

It is known that the properties of halogenated and sulphohalogenated polymers vary as a function of the process by which they have been produced. In fact, the properties of the polymer result from the distribution of the halogen atoms and sulphohalogenated groups along the molecular chain. Thus, the structure of a polyolefin comprises amorphous zones which can be easily halogenated or sulphohalogenated and crystalline zones, called crystallites, in which the halogen atoms and sulphohalogenated groups are fixed with much greater difficulty.

When the polymer is sulphohalogenated in the dissolved state, the crystallites no longer exist and there is found a uniform distribution of the sulphohalogenated groups and the halogen atoms along the macromolecular chain. However, it is very difficult to regulate the degree of sulphohalogenation and if the latter is too high, rigid and brittle products are obtained. If, on the contrary, the degree of sulphohalogenation is too low, the polymers obtained are soft and sticky. Moreover, the use of a solvent constitutes a heavy burden on the cost of the sulphohalogenated polymer produced.

If the polymer is sulphohalogenated in suspension in an inert organic liquid, the reaction temperature which is necessarily low is insufficient to free the crystallites and only the amorphous zones are sulphohalogenated. The great number of halogen atoms and sulpho halogenated groups fixed in these zones results in a hardening of the polymer and there are thus obtained rigid and brittle products which are difficult to use. Moreover, these polymers are not very stable to heat and light and rapidly turn yellow.

The applicants have developed a process, for the production of sulphohalogenated polymers and co-polymers of olefins, which does not have the aforesaid disadvantages, that is to say a process enabling sulphohalogenated polymers of olefins to be produced which are flexible, stable, possess a homogeneous rubber-like structure and are vulcanizable.

The process forming the object of the invention consists in reacting a sulphyryl halide or a gaseous mixture of halogen and sulphurous anhydride on the solid finely divided olefin polymer or co-polymer, in the presence of an antistatic agent and at a temperature which is above or equal to the starting temperature of the endothermal fusion phenomenon characteristic of the polymer treated.

The temperature at which the process of sulphochlorination developed by the applicants proceeds is defined in relation to the specific temperature of each polymer or co-polymer, said temperature being determined by differential thermal analysis. This method consists in subjecting to the same regular rise of temperature on the one hand a thermally inert material serving as reference, and, on the other hand, the examined material which is susceptible to physical or chemical transformations accompanied by the evolution or absorption of heat. The curve illustrating the difference of temperature existing at any instant between this material and the reference material enables the physical or chemical transformations of the material under investigation to be adjusted.

More particularly, the curve of the differential thermal analysis of an olefin polymer or co-polymer reveals two temperatures which correspond to the start and the end of the endothermal phenomenon due to the fusion of the polymer crystallites, that is to say to the melting range of the material.

In the process of the invention the operative temperature is above or equal to the starting temperature of the endothermal fusion phenomenon characteristic of the treated polymer or co-polymer. At this temperature the rigidity of the crystallites of the starting polymer weakens and this permits a homogenous sulphochlorination of the macromolecules. The sulphohalogenated groups and halogen atoms are evenly distributed along the macromolecular chain.

However, by working at such high temperatures, the polymer rapidly deteriorates in the course of the reaction, turns yellow or even chars. Moreover, the particles of matter agglomerate, stick together forming small balls, or strongly adhere to the walls of the reactor.

The applicants have found that these disadvantages can be obviated by carrying out the sulphohalogenation of the polymer after admixing an antistatic agent, generally at the rate of 0.5 to 5% per weight of the polymer. The sulphohalogenated polymer obtained under these conditions is a flexible white solid which remains stable when subjected to the action of heat and/or light. It is obtained in the form of friable grains which are easy to handle and can be removed from the reactor without any difficulty.

The best results are obtained by using quaternary ammonium salts and tertiary amines as antistatic agent. The relation existing between the nature and molecular structure of the antistatic agent and the properties of the sulphohalogenated polyolefins stabilized by these agents is not exactly known. It appears that the organic nitrogen atom is necessary for obviating the charring of the polymer. To this nitrogen atom there must be fixed one or more aliphatic or aromatic organic chains. It has been found that the number and length of the organic chains influence the appearance and the physical properties of the sulphohalogenated polymer. The use of an antistatic agent containing a sufficient number of important organic chains enables a friable sulphohalogenated polymer to be obtained which does not stick and is easy to handle.

Of the quaternary ammonium salts which prove to be especially effective there may be mentioned for example dimethyl-benzyl-lauryl ammonium chloride, octadecyl-trimethyl ammonium chloride, dodecyl-trimethyl ammonium chloride, N-benzyl-N-methylaniline chloride and dimethyl-benzyl-phenyl ammonium chloride. Good results have also been obtained by using tertiary amines such as dibenzylhexadecylamine, tripropylamine, triethanolamine and the amines of the general formula

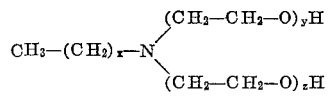

wherein $x$ varies from 1 to 20 and $y$ as well as $z$ vary from 2 to 25. Reaction products of triethanolamine with arylalkyl sulphonates are likewise suitable.

In the process of sulphohalogenation being the object of the invention the sulphohalogenating agent may be a sulphuryl halide, a mixture of sulphuryl halide and the corresponding halogen or a mixture of halogen and sulphurous anhydride.

The process is preferably carried out in two steps: initially there is carried out a partial halogenation of the polymer at a temperature below the starting temperature of the endothermal fusion phenomenon characteristic of the polymer or co-polymer treated, then the halogenation is completed and sulphohalogenation carried out at a temperature at least equal to that at the start of the phenomenon specified above, in the presence of an antistatic agent.

The two steps may be conducted either by preparing a suspension of the solid finely divided polymer or co-polymer, in gaseous halogen or a gaseous mixture containing the sulphohalogenating agent, for example according to the method of fluidized beds, or by placing the gaseous reagents in contact with a bed of finely divided polymer stirred in a mobile reactor.

In both cases the reactive gases may be diluted in an inert gas. When a mixture of sulphurous anhydride and halogen is used for the sulphohalogenation, the incorporation of sulphur in the polymer is the more substantial the richer in anhydride the gaseous mixture. With rich mixtures sulphur contents of the order of 3% by weight may be attained. In the case of sulphochlorination of polyethylene, the quantities usually fixed are 5 to 15 g. of sulphur per kg. of polymer.

The reaction speed during two steps of the process is advantageously influenced by illuminating the reaction medium by an actinic light source.

As polymers and co-polymers of olefins there are to be understood any polymer of ethylene and its homologues, for example propylene, butene, isobutene, pentene, hexene, as well as the co-polymers of these olefins. These polymers and co-polymers can be obtained by any known process of polymerization, for example under reduced pressure in the presence of a chromium oxide catalyst for a complex catalyst prepared from a transition metal compound, an organometallic derivative and possibly a third compound.

The process which is the object of the invention is especially applicable to the sulphochlorination of polyethylenes, ethylene-propylene co-polymers and ethylene-butene co-polymers.

The sulphohalogenated olefin polymers and co-polymers produced according to the process being the object of the invention are suitable for a great number of applications on account of their excellent properties. Their moduli of rigidity determined at 40° C. for a torsional angle of 110° according to standard ASTM 1043–51 are weak and characterize a state of flexibility which locates these products between the soft sticky rubber-like materials and the rigid brittle products which have been produced by previous methods of sulphohalogenation.

Their content of sulphur is sufficient to permit direct vulcanization by simple and inexpensive formulae. The remarkable mechanical properties of the vulcanized sulphohalogenated polyolefins produced according to the process of the invention are described in the following examples.

Non-vulcanized sulphohalogenated polymers can be used for improving the shock-resistance of compositions based on homopolymers or co-polymers of vinyl chloride, styrene, vinyl acetals etc. The quantity of sulphohalogenated polymer to be incorporated in these compositions varies according to the desired degree of shock-resistance and may be for example of the order of 5 to 50% by weight of total mixture.

The following examples are given for the purpose of illustrating the process according to the invention without limiting its scope.

EXAMPLE 1

There is carried out a series of sulphochlorination tests of polyethylene samples having a mean molecular weight of 145,000 and prepared by the suspension process in the presence of a chromium oxide catalyst. The temperatures at the start and the end of the endothermal fusion phenomenon characteristic of this polymer are 126° and 139° C. respectively. In each test the first reaction period that is to say the partial chlorination is carried out under identical conditions, whereas in the second period the chlorine and sulphurous anhydride supplies as well as the duration of the operation are varied.

*First period.—Partial chlorination*

Into a rotary cylindrical reactor with a capacity of 3 litres rotating at a rate of 60 r.p.m. in an oil bath, there are introduced about 200 g. of polyethylene granules. A thermocouple enables the temperature to be taken in the material. The reactor is de-gasified with nitrogen and the heating system is started. When a volume of nitrogen equalling about 5 times the capacity of the reactor has passed into the apparatus and the temperature has reached about 100° C., chlorine is introduced into the apparatus in a quantity of about 3.5 mol g. per kg. of polyethylene an hour. The operation is stopped when the chlorinated polyethylene contains about 100 g. of chlorine per kg.

*Second period.—Sulphochlorination*

The partially chlorinated polyethylene is mixed with 2% by weight of an antistatic agent in the form of a 85% solution of dimethyl-benzyl-lauryl ammonium chloride in isopropanol. The partially chlorinated polyethylene is reintroduced into the reactor and brought to a temperature which lies about 10° C. below the starting temperature of the endothermal fusion phenomenon. Chlorine and sulphurous anhydride are then introduced in varying quantities. As soon as the reagents are introduced, the temperature of the polymer rises and, due to the exothermal nature of the reaction, reaches the starting temperature of the endothermal fusion phenomenon. The following Table I enables the results of the three tests to be compared.

TABLE I

| Supplies, mol g./kg. PLT.h | | $SO_2/Cl_2$, mol g./mol g. | Duration of 2d period, hours | $Cl_2$ in 2d period, g./kg. | S fixed in 2d period, g./kg. | S/Cl fixed in 2d period, g./g. |
|---|---|---|---|---|---|---|
| $Cl_2$ | $SO_2$ | | | | | |
| 6.35 | 2.07 | 0.33 | 3 | 450 | 6.1 | 0.0135 |
| 6.35 | 6.26 | 1 | 2.25 | 350 | 16.1 | 0.046 |
| 2.28 | 9.15 | 4 | 6.75 | 460 | 31.5 | 0.069 |

It will be seen that the incorporation of sulphur is the more important the richer in sulphurous anhydride the gaseous mixture. It is possible to attain high sulphur contents of the order of 3% by weight but this result is obtained only with mixtures which are very rich in $SO_2$.

EXAMPLE 2

A sample of ethylene-butene co-polymer containing 2 to 3% of butene and having a mean molecular weight comprised between 40,000 and 50,000 is partially chlorinated according to the method described for the first period of Example 1. This co-polymer contains about 80 g. of chlorine per kg. of chlorinated material. The co-polymer is mixed with 2% by weight of an antistatic agent in the form of a 85% solution of dimethyl-benzyl-lauryl ammonium chloride in isopropanol. The partially chlorinated co-polymer is introduced into a rotary cylindrical reactor fitted with the devices described in Example 1. The reactor is de-gasified with nitrogen while heating the co-polymer until the temperature reaches about 105° C. At this instant, the reactor is illuminated by means of a mercury lamp of 450 w. and a gaseous mixture of sulphuryl chloride and nitrogen is introduced in quantities of 4.55 mol g. $SO_2Cl_2$/hour kg. of co-polymer and 5.45 mol g. of $N_2$/hour kg. of co-polymer. During this time the temperature of the reactor is raised in such a manner that it reaches 135° C. after 1 hour. The temperature is maintained during the whole duration of the reaction. After a reaction of 3 hours, the reactor is de-gasified with nitrogen and a white substance is withdrawn in the form of friable granules. After washing with distilled water and drying under vacuum at 50° C., the co-polymer is analysed. It contains 300 g. of chlorine and 3.2 g. of sulphur per kg. of sulphochlorinated co-polymer. Its apparent modulus of rigidity in torsion at 40° C. for an angle of 110° is 23.5 kg./cm.².

EXAMPLE 3

According to a process identical with the one described in Example 1, there is carried out the sulphochlorination of a sample of polyethylene having a mean molecular weight of 160,000 and prepared by polymerisation in the presence of the catalyst $TiCl_4 + Sn(C_4H_9)_4 + AlCl_3$. The temperatures at the start and the end of the endothermal fusion phenomenon characteristic of this polymer are 116° and 138° C. respectively.

The sulphochlorinated polyethylene thus obtained is a flexible stable material containing 381 g. of chlorine and 13.2 g. of sulphur per kg. of sulphochlorinated polymer. Its apparent modulus of rigidity in torsion determined at 40° C. according to standard ASTM 1043–51 is approximately 10 kg./cm.².

Two tests of vulcanization of this sulphochlorinated polyethylene are carried out, one in the presence of a charge; the other without. The charge may be carbon black, silica, alumina, precipitated calcium carbonate or any other substance commonly used for loading natural or synthetic polymers. The vulcanization formulae employed are given in the following Table II. Weights are given in g. per 100 g. of starting material.

TABLE II

| Constituent | Uncharged | Charged |
|---|---|---|
| Sulphochlorinated polyethylene | 100 | 100 |
| Litharge | 40 | 40 |
| Stearic acid | 0.4 | 0.4 |
| Catalyst | 1.25 | 1.50 |
| Plasticiser | 2.10 | 2.10 |
| Charge: | | |
| Plasticiser | | 15 |
| Antioxidant | | 3 |
| Carbon black | | 36 |

The chief mechanical properties of these vulcanization products are measured and the results given in the following Table III. These properties are compared with those of sulphochlorinated polyethylenes produced according to a process in a solution. These compounds of different characteristics are designated in the following Table III by $X_1$, $X_2$, $X_3$ whereas the sulphochlorinated polyethylene produced according to the invention is designated by PLTSC.

TABLE III

| | Uncharged vulcanization products | | | | Charged vulcanization products | |
|---|---|---|---|---|---|---|
| Examined products | $X_1$ | $X_2$ | $X_3$ | PLTSC | $X_1$ | PLTSC |
| Viscosity Mooney at 100° C. of the product as such [1] | 26 | 28.5 | 53 | 127 | 26 | 127 |
| Properties of the crude mixtures: [2] | | | | | | |
| Plasticity Williams at 70° C.[3] | 2.08 | 3.14 | 2.72 | 6.08 | 2.51 | 6.91 |
| Elastic return Williams [3] | 0.46 | 0.97 | 0.46 | 2.31 | 0.32 | 2.45 |
| Precocity Mooney at 120° C.[4] | 21.00 | 15.45 | 13.10 | 4.00 | 15.40 | 4.28 |
| Corresponding viscosity Mooney [1] | 13.5 | 12.5 | 23.0 | 47.5 | 10.0 | 62.0 |
| Properties of vulcanization products: | | | | | | |
| Vulcanization temperature (° C.) | 152 | 152 | 152 | 152 | 152 | 152 |
| Optimum of vulcanization (min.) | 75 | 120 | 60 | 20 | 30 | 15 |
| Modulus at 300% elongation [5] | 76 | 134 | 53 | 64 | 112 | 239 |
| Breaking strength [5] | 202 | 179 | 212 | 307 | 113 | 332 |
| Elongation at breaking point (percent) | 428 | 353 | 472 | 405 | 315 | 353 |
| Tearing resistance [6] | 23 | 42 | 26 | 19 | 27.5 | 31 |
| Hardness Shore $A_2$ [7] | 62 | 71 | 56 | 60 | 67 | 71 |
| Elasticity Shore [7] | 91 | 93 | 92 | | | |
| Permanent elongation (percent) | 44 | 23 | 45 | 17 | | Broken |
| Abrasion DIN [8] | 85 | 166 | 78 | 76 | 121 | 75 |

[1] According to standard ASTM D 927–57 T, units Mooney.
[2] The "crude mixture" is the mixture leaving the mixer and containing the various ingredients which will intervene in the vulcanization.
[3] According to standard ASTM D 926–47 T, units: mm.
[4] According to standard ASTM D 1077–49 T, units: minutes.
[5] According to standard ASTM D 412 (51 T, units: kg./cm.²).
[6] According to standard ASTM D 624–54, units: kg./cm.
[7] According to standard ASTM D 676–49 T, units: Shore.
[8] According to standard DIN 53 516, units: mm.³.

It follows from this table that the vulcanization products of sulphochlorinated polyethylenes produced according to the process of the invention have unquestionable advantages with regard to their mechanical properties. It has also been found that the vulcanized sulphochlorinated polyethylenes exhibit a very good resistance to the action of ozone, hydrocarbons and cold.

It is also possible to produce microcellular sponges of vulcanization products from sulphohalogenated polymers produced according to the invention by incorporating in the vulcanization formula a swelling agent in a proportion of 2 to 3% by weight.

We claim:
1. A process for the production of vulcanizable sulphohalogenated polymers of lower mono-olefins which comprises determining the upper and lower temperatures of the melting range for a polymer selected from the group consisting of lower mono-olefinic homopolymers and lower mono-olefinic copolymers, partially halogenating said polymer at a temperature below the lower temperature limit of said melting range, admixing an antistatic agent selected from a group consisting of quaternary ammonium salts and tertiary amines with said partially halogenated polymer, and contacting said partially halogenated polymer at a temperature at least as high as the lower temperature limit of said melting range with a gaseous sulphohalogenating agent selected from the group consisting of sulphuryl halide, a mixture of a halogen and sulphurous anhydride, and a mixture of sulphuryl halide and the corresponding halogen.

2. Process according to claim 1 wherein said antistatic agent is selected from the group consisting of dimethyl-benzyl-lauryl ammonium chloride, dibenzyl-hexadecyl-amine and the amines of the general formula

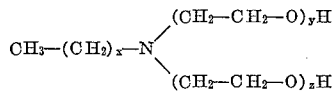

wherein $x$ varies from 1 to 20 and $y$ and $z$ varies from 2 to 25.

3. Process according to claim 1 wherein said antistatic agent is used in a proportion of 0.5 to 5% by weight of said polymer.

4. A process for the production of vulcanizable sulphohalogenated polymers of lower mono-olefins according to claim 1 wherein said solid finely divided polymer is kept in a suspension in said gaseous sulphohalogenating agent.

5. A process for the production of vulcanizable sulphohalogenated polymers of lower mono-olefins according to claim 1 wherein a bed of said solid finely divided polymer stirred in a rotary reactor is contacted with said sulphohalogenating agent.

6. A process for the production of vulcanizable sulphohalogenated polymers of lower mono-olefins according to claim 1 wherein said sulphohalogenating agent is admixed with an inert diluent.

7. A process for the production of vulcanizable sulphohalogenated polymers of lower mono-olefins, according to claim 1 wherein said sulphohalogenating agent is sulphuryl chloride.

8. A process for the production of vulcanizable sulphohalogenated polymers of lower mono-olefins according to claim 1 wherein said sulphohalogenating agent is a mixture of chlorine and sulphurous anhydride.

References Cited by the Examiner

UNITED STATES PATENTS

| | | | |
|---|---|---|---|
| 2,327,517 | 8/1943 | Frolich et al. | 260—94 |
| 2,586,363 | 2/1952 | McAlevy. | |
| 2,879,244 | 3/1959 | Coler | 260—32.6 |
| 2,945,842 | 7/1960 | Eichhorn et al. | 260—96 |
| 2,972,604 | 2/1961 | Reynolds et al. | |
| 3,163,631 | 12/1964 | Schwander et al. | 260—88.2 |

FOREIGN PATENTS

| | | |
|---|---|---|
| 235,096 | 9/1959 | Australia. |
| 815,234 | 6/1953 | Great Britain. |

MORRIS LIEBMAN, *Primary Examiner.*

D. W. ERICKSON, J. E. CALLAGHAM, *Assistant Examiners.*